(12) United States Patent
Randall

(10) Patent No.: US 7,450,954 B2
(45) Date of Patent: Nov. 11, 2008

(54) SYSTEM AND METHOD FOR LOCATION-BASED INTERACTIVE CONTENT

(75) Inventor: Stephen Randall, Wellesley, MA (US)

(73) Assignee: LaModa, Inc., Cambridge, MA (US)

( * ) Notice: Subject to any disclaimer, the term of this patent is extended or adjusted under 35 U.S.C. 154(b) by 378 days.

(21) Appl. No.: 11/275,939

(22) Filed: Feb. 6, 2006

(65) Prior Publication Data

US 2006/0179127 A1    Aug. 10, 2006

Related U.S. Application Data

(60) Provisional application No. 60/650,485, filed on Feb. 7, 2005.

(51) Int. Cl.
*H04Q 7/20* (2006.01)

(52) U.S. Cl. ............... 455/456.1; 455/403; 455/456.3; 455/456.2; 455/457; 709/219

(58) Field of Classification Search ............... 455/403, 455/456, 456.3, 456.1; 709/219
See application file for complete search history.

(56) References Cited

U.S. PATENT DOCUMENTS

| 5,835,861 A | 11/1998 | Whiteside |
| 6,650,902 B1 * | 11/2003 | Richton .................. 455/456.3 |
| 6,973,322 B2 * | 12/2005 | Buchmann et al. ....... 455/456.3 |
| 2003/0125049 A1 * | 7/2003 | Buchmann et al. .......... 455/456 |
| 2004/0214550 A1 * | 10/2004 | Jenkins ..................... 455/403 |

OTHER PUBLICATIONS

Imielinski, Tomasz et al., "Wireless Garffiti - Data, data everywhere"; 2002; Department of Computer Science, Rutgers University, Piscataway, NJ 08854.

Kindberg, Tim et al., "People, Places, Things: Web Presence for the Real World"; Oct. 31, 2001; Internet and Mobile System Laboratory, Hewlett-Packard Laboratories, Palo Alto, CA.

* cited by examiner

*Primary Examiner*—David Q Nguyen
(74) *Attorney, Agent, or Firm*—Bromberg & Sunstein LLP

(57) ABSTRACT

A system and method for providing and managing location-based interactive content, including messages sent to specific location-based screens via mobile communication devices or the Internet. The location-based screens are display devices connected to a central content server that may be a central website, by a first network that may be the Internet. Each location-based display device may be independently controlled by a communications management module at the central website. The communications management module includes software and hardware so that it may record a user's responses and may update any screen according to system policies.

20 Claims, 4 Drawing Sheets

SYSTEM AND METHOD FOR LOCATION-BASED INTERACTIVE CONTENT

CROSS REFERENCE TO RELATED APPLICATIONS

This application is related to, and claims priority from, U.S. Provisional Patent application No. 60/650,485 filed on Feb. 7, 2005, by Stephen Randall entitled "System and method for location-based interactive content", the contents of which are hereby incorporated by reference. This application is related PCT application US05/40186 filed on Nov. 4, 2005 by Stephen Randall et al. entitled "A System and Method for Interactive Marketing", the contents of which are hereby incorporated by reference.

FIELD OF THE INVENTION

This invention is directed towards location-based content displayed on Internet-connected screens and/or the Internet, and being interacted with via electronic communications devices and/or Internet.

BACKGROUND OF THE INVENTION

"Out-of-home" digital media networks are like private television channels run by companies, organizations and advertisers in locations such as shopping malls, retail chains, or franchise operations. Such networks are sometimes also referred to as location-based or narrow-cast networks, because unlike broadcast media, they are designed to appeal to the audience at or close to a specific location.

Location-based services typically refer to services that are able to determine and then leverage the location of a user. One of the best-known methods for determining location is via the US military satellite triangulation system known as the Global Positioning System (GPS). GPS radio receivers are able to receive different signals from specific GPC satellites, and then triangulate those signals to determine positional information. This is can then be used by an application such as mapping software, to show a user where they are currently located.

Another popular method of determining location is to use the cellular mobile phone infrastructure. Cellular mobile phone systems know the identity of the cell a handset is connecting from. Even though cell sizes vary, and therefore accuracy of such systems varies, the information can be of use to applications such as emergency services. However, cellular systems are not ideal for applications, which require seamless integration with all mobile handsets, as at present, there are many different standards, networks, handsets, operating systems, and each requires close cooperation for developers.

Mobile communications devices such as, but not limited to mobile phones are becoming more sophisticated every day. Many such devices are not only capable of providing voice communication, but also text, picture and video messaging.

Many mobile communication devices also have many of the features of a computer connected to the Internet. Whilst many people have access to services on the Internet via a mobile communications device, the reality is that devices designed for mobility tend to have smaller screens than desktop computers, televisions, and out-of-home screens. As a result, products and services are difficult to discover and/or access. Flipping open a phone, selecting a web browser, typing in a web site address, then clicking or searching for the specific information can be too complex for many consumers.

It is known that users need to find their intended digital destination in the least number of steps (or clicks). At every step, some users abandon their mission. Some user interface experts have reported that up to 25% of users are lost for every click. In other words, data services should be ideally accessed within 3-4 clicks to ensure a reasonable user-base.

At the end of 2004, there were more than 1 billion mobile phone subscribers worldwide. Many of these phones are capable of communication data as well as voice. Data can be in the form of an SMS message, a picture, or even multimedia—such as video and games. Mobile phones are personal devices and tend to be more trusted than many other computing devices. As a result, a mobile information society is developing. Personalized and localized services are believed to become increasingly more important.

"Virtual graffiti" applications such as tagandscan, that was described in www.newscientist.com on 17 Dec. 2003. Such applications let users of a mobile phone post a message to specific mobile phone cell. By logging on to website that lists the cells, users can view the messages in specific cells. Alternatively, applications on cell phones that are able to access cell information are able to retrieve messages on the cell phone. However, with "virtual graffiti" there is no visual indication that a message has been posted in a specific location without browsing an application either on the mobile communication device or a website. Furthermore, such an implementation either requires special software to be downloaded—something that is not necessarily possible on all mobile devices or requires tight integration between software, networks, and mobile communication devices to embed the application on the device. In the absence of standard application program interfaces (APIs) this strategy requires close cooperation of the cellular operators and handset manufacturers and operating system providers.

Bulletin Boards on the web are a popular way of posting messages. Likewise, web logs ("Blogs"), which contain periodic postings on a web page, have become popular for simple personal web publishing, such as individual diaries, or political campaigns. Blogs are typically chronological publications of personal thoughts and Web links. They are often a mixture of what is happening in a person's life and what is happening on the Web, a kind of hybrid diary/guide site. People maintained blogs long before the term was coined, but the trend gained momentum with the introduction of automated published systems, most notably Blogger at blogger.com. Thousands of people use services such as Blogger to simplify and accelerate the publishing process. These systems tend to be centered around a person or a topic, but often lack a dimension of community due to failing to be location-centric.

Interactive billboards that communicate or detect mobile devices such as described by U.S. Pat. No. 5,835,861, require mobile devices to have wireless technologies such as Bluetooth or Infra Red (IR), as well as their regular wireless capabilities. This approach fails to appreciate that such technologies are often buried deep in the user interface of a mobile devices, making them difficult to access instantly. Also, these technologies are frequently implemented in non-standard ways, creating incompatibilities between the billboard and the mobile device. Further, with IR, the user needs to line-of-sight to align their device with the transceiver, which is not ideal in an outside environment.

Systems such as Hewlett-Packard's "Cooltown" have disclosed a location-aware architecture that can be created using URL's for addressing, physical URL beaconing and sensing of URL's for discovery, and localized web servers for directories. The Hewlett-Packard vision describes users receiving messages from beacons in a similar fashion to the interactive billboards. Hewlett-Packard also describe how users can "squirt" URL's from their mobile devices to activate printers or other devices. Their vision not only requires ubiquity of web-enabled mobile devices, it also requires users to access enchanting services easily and swiftly. The Cooltown system requires a web browser and display capability in the users mobile device to navigate within the Web page indicated by the URL broadcasted. In addition, the user gets exposed to URL's without knowing in advance whether or not the content information of the associated Web page is relevant to the user. As mentioned previously, creating data services that can be actioned within 3 clicks in such a scenario, is at the very least, challenging.

A number of companies have used digital billboards at a location such as a stadium or arena, to display SMS messages from audience members. As an example, fans were able to send encouragements by SMS to Athletes during the course of the Paris Saint-Denis World Athletic Championships held in Paris in August 2003. Spectators were able to send (premium rate) SMS text messages of encouragement to their favorite athletes, which were alternately displayed on two giants screen in the stadium. Designed to entertain audiences during a show, these applications do not support data for or from consumers at other locations, either physical (such as other arenas) or virtual (such as websites). Also, being event-centric, such applications are by default, one-off events, and therefore miss the opportunity to provide a time-lapse view of data sent to the same location over time which can add an interesting and social dimension to the data.

Companies have developed applications using a single screen or bank of screens in a single location such as a lobby, able to respond to email, Instant Messages (IM) or SMS messages. This type of application provides information or entertainment for visitors or staff. These applications do not teach the value of networking a plurality of locations, each with at least one Internet-connected screen and each Internet-connected screen being independently addressable, with at least one central website, able to view and/or create content for any or all locations, which results in a truly multi-model and fully heterogeneous, duplex communication and social information infrastructure.

The present invention addresses these and other shortcomings by providing a system that supports a plurality of independently addressable Internet-connected screens, each able to display content sent via mobile devices or the Internet. The display of the content depends on policies set by the system administrator. Consequently, content sent to the system can be read at specific locations, as well as being accessed via the web and/or mobile devices. Having content available and displayable at a location, makes it more likely to be discovered and relevant to users at those locations without requiring special beacons or additional detection devices or additional software on the users' mobile devices. The act of engaging with the content can be facilitated by all mobile devices that can make voice calls to use interactive voice response (IVR) systems or make data calls for example but not limited to using SMS, using a device's keypad.

With such a system, messages and/or content, especially those with a community, local, social or political context, can be posted for public consumption in locations where they might have most relevance.

SUMMARY OF THE INVENTION

The present invention provides a location-based method and system that overcomes many of the shortcomings of the prior-art discussed above. In particular, a preferred embodiment of the present invention enables location-based services to be more user-friendly and instantly discoverable than the systems discussed above.

In a preferred embodiment of the present invention messages may be sent to specific location-based screens via mobile communication devices or the Internet. The location-based screens are display devices that connected to a central content server that may be, but is not limited to, a central website, by a first network that may be, but is not limited to, the Internet. Each location-based display device may be independently controlled by a communications management module at the central website. The communications management module includes software and hardware so that it may record a user's responses and may update any screen according to system policies.

These and other features of the invention will be more fully understood by references to the following drawings.

DETAILED DESCRIPTION

Figure 1:
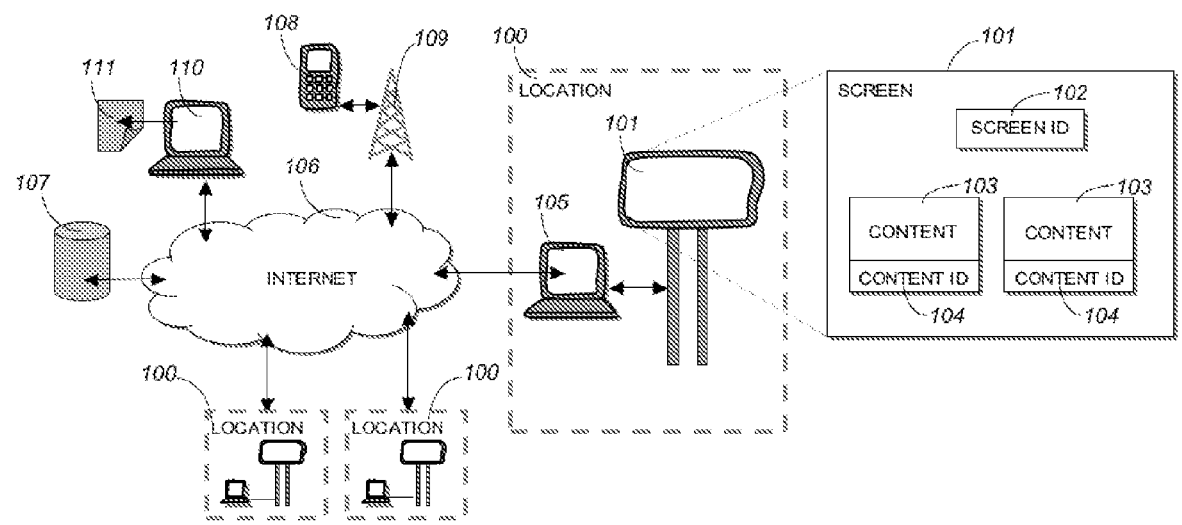
FIG. 1 is a high level view of a system representative of an exemplary embodiment of the present invention.

The present invention relates to a system and method for providing and managing location-based interactive content.

In a preferred embodiment of the invention, there are number of display devices each located in a distinct geographic location, each having a unique display identifier that may be displayed on the device. The unique identifier may, for instance, be a telephone number that is the number to call to post a message on that screen. The unique identifier may also, or instead, be, but is not limited to, a Short Message System (SMS) short code, an electronic mail address or an instant message address.

The display screens may be any suitable means of displaying audio-visual material such as, but are not limited to, a projector, a plasma screen, an light emitting diode (LED) screen or a cathode CRT, and may include the associated audio speakers.

The system of the invention also includes a content server, that may be a web site or a part of a web site, situated remote from said display devices and connected to the display devices by a first network, such as but not limited to, the Internet.

The content server is configured to be able to store content. The content may be any suitable audiovisual content including, but not limited to video, graphics, text, voice, multimedia or games content. The content is typically processed in the form one or more digital data packages, each data package being representative of an audible sound, a graphic image or an alphanumeric character.

The content server is further able to serve the content to the display devices.

In a preferred embodiment, the system also includes at least one electronic communications device, connected to the content server via a second network. The electronic communications device may be a mobile wireless device, such as but not limited to a mobile phone, handheld computer or personal digital assistant (PDA) that is able to transmit and to receive messages to said server via a second network such as, but not limited to, a wireless telephone network. The second network may be any suitable network capable of receiving communications from and transmitting communications to electronic communications devices including a wireless network such as but not limited to cellular, 802.11 (WiFi), Bluetooth, 802.15.4 (ZigBee), or Radio Frequency Identification (RFID).

In a preferred embodiment there is also a communications management module running on the content server. The communication management module may include an Interactive Voice Response (IVR) system and be capable of handling more than one caller at a time and may be capable of voice recognition.

In a further embodiment of the system, the the communications management interface may be a Short Message System Center (SMSC) that is capable of guiding, responding to, outputting, logging a user initiated communication and of handling a plurality of callers.

In a preferred embodiment of the invention, the communications management module includes a user interface module configured so as to guide, respond to, and log a user initiated communication from an electronic communications device, that may be connected via the second, wireless network. The user interface module includes suitable hardware and software to capture and store voice messages and data messages that are entered by users, as well as to build profiles of users and record user interactions.

In a preferred embodiment, there may also be a content management module setup to receive, filter and store content, send commands for the content via the first network, send the content itself via the first network, to associate the content with unique identifiers and to create the content from the messages. Creating the content may include the generation of content display parameters, such as, but not limited to, a time-stamp, a degree-of-importance stamp, a display location stamp, a user ID stamp, a user location stamp and a presence stamp. These stamps may be based on information based on querying the user, or they may be derived on data obtained automatically from the communications device or other source.

In a preferred embodiment, there is also a content direction and display module configured to direct the content and one or more screen display parameters to any of said display devices. The content display module may include hardware and software configured to translate one or more of the content display parameters into one or more screen display parameters such as, but not limited to, an effective font size, a color, a location, a zoom, a stacking level, a transparency, a location drift, a zoom drift, a stacking drift and a transparency drift. The content display parameters may be used determining the manner of displaying the message of the display screen. The stacking level may for instance determine what other messages any given message partially or completely obscures, and the transparency drift may be a time dependent function so that the longer the message is on the screen, the lower down the stacking order the message drifts, and the more other messages obscure it. Similarly, the location parameter may initially place the message in the center of the screen, and the location drift parameter may be a time dependent function that causes the message to drift either horizontally or vertically on the screen with time. The time drift may also define a path for the message to take and a speed, that may it self vary with time, at which to traverse that path. Zoom drift, color drift, and transparency drift may be time dependent functions that cause their primary parameter to change or oscillate with time in an analogous fashion as the location drift parameter.

In a preferred embodiment of the invention, there is also a screen display module running on the display device configured for receiving and displaying the content on the display device responsive to the screen display parameters. In one embodiment of the invention the communications are sent and received in real time.

The various features and methods of a preferred embodiment of the invention will now be described in the context of an interactive self-help system and method with reference to the accompanying figures in which, as far as possible, like numbers represent like elements.

FIG. 1 illustrates the basic components of the system. Internet-connected screens 101 display content 103. The screens 101, are typically but not exclusively located at a location in a public space such as a store front, museum or café and are individually addressable in order to display content sent from users or from the web.

The Internet-connected screens display an Internet-connected screen ID or identifying number 102, which is unique to every Internet-connected screen in the system. Optionally, a local content server, 105 can be connected to a screen and the Internet 106 in order to serve content locally.

A user's mobile communications device 108, can send content to the system via a wireless network 109. Content, such as but not limited to voice, DTMF tones, or an SMS message, is transmitted via wireless networks 109, to the messaging manager 107, which can be a Short Message System Center (SMSC) or an Interactive Voice Response (IVR) Center. Those skilled in the art, will understand that such message managers are capable of interpreting multiple types of messages. For example, IVR inputs can be DTMF tones or voice instructions which are then translated by voice recognition software into commands. Consequently, the message manager 107, can translate a caller's instructions into data that can be sent to and processed by the system manager 110.

The system manager logs all data such as messages and content information and, subject to policies can pass the content over the Internet to the local content manager 105, which then updates the intended Internet-connected screen 101. The system manager 110, can also display the content on a website.

In a preferred embodiment of the system, content on an Internet-connected screen can also have unique identifiers or tags 104. The unique identifiers or tags 104, can be entered by users to command the system to execute additional features. For example, a screen might display "#1 to see your message in Font 1. #2 to see your message in Font 2". A user can therefore send a text message or a voice call, followed by the command #1 or #2 to instruct the system to display their message in the desired font. The content ID could also be used to enter the answer to a poll (eg #1 for yes, #2 for no) or to create animation effects (eg #1 for fast, #2 for slow). Those skilled in the art will understand that content IDs are not limited the above examples. Content ID can be used via a mobile communications device to remotely instruct the system to execute any feature that has been pre-programmed and assigned to the content ID.

Those skilled in the art will also understand that the screen of such a system could be a any electronic display device capable of being connected to a network and displaying digital content, such as but not limited to a projector, a plasma screen, an LED screen or a CRT.

In a preferred embodiment, the user's mobile communications device could be a cellular phone, routing messages via cellular networks, but the invention can also work with wireless devices over 802.11 (WiFi) wireless systems, Bluetooth, Infra Red, Zigbee or other wireless networks to afford wireless control of the screen 101.

A user desiring to post content to the local screen 101, interacts by texting or dialing the screen ID, 102, on their mobile communications device 108. The screen ID 102, can be a phone number for voice calls which can be managed by an Interactive Voice Response (IVR) system, or a phone number for data calls such as Short Message System (SMS) calls.

The consumer's interaction is transmitted via wireless networks 109, to the messaging manager 107, which can take SMS or IVR inputs such as DTMF tones or can utilize voice recognition software and consequently, can translate a caller's instructions into commands that the system manager 110 can turn into content displayed on the location screen 101.

The system manager 110 sends, if applicable, a response or an update to a specific Internet-connected location screen 101. That update might for example instruct the screen to display new content. It can also send the answer to a poll, or increment or decrement a vote.

The system manager 110, can also send a response to the user's mobile communications device 108. That message might for example thank the user for their participation. The message could combine information from the user's profile or previous transactions, to create a more personal message. In a preferred embodiment of this invention, a message sent to a user's mobile communications device 108 would compliment a message sent simultaneously to the location screen 101.

In another embodiment of the invention, the system can send a message to a users mobile communications device requesting that they assign themselves a screen name. If the user replies with a screen name, the system can then credit postings automatically with a sender's screen name as opposed to displaying their phone number, or part of their number or the word "anonymous".

All user interactions are logged by the system manager and stored in a database which can output/archive report logs 111. The system logs 111 can include information such as location (taken from the screen ID, 102), time, date, the user's telephone number. Those skilled in the art will appreciate that such logs can be integrated into a database, capable of building profiles of customers interacting with the system.

Whilst location data is known by the system from the screen ID 102, it can be supplemented by the mobile communications device's area code if available. Furthermore, if the mobile communications device's is able to output digital location information for example such as its cell location or Global Positioning System (GPS) co-ordinates, the system could make use of this information.

Whilst the system is designed as a distributed content system, there are invariably several considerations for where content is stored and served. For bandwidth constrained applications or applications with large content files such as video, the system can have a local content manager such as 105 co-located with the screen 101 at the location, directly serving the screen. In such a configuration, the system just needs to pass the navigation commands to the local content manager 105, which then serves up the content to the screen 101. Non-user generated content, for example, a promotion, or a news feeds, can be sent via the system manager 110, in the background of a running application or during periods when the system is less active. In any case, this design configuration is based on the concept that whilst the responsiveness of the system to users' commands happens in real time, non-user generated content is less critical and is therefore not required in real time. Where bandwidth considerations are less critical, content could be served directly over the Internet 106 from the content manager 110 to screen 101. It should be clear that the content server, 105 whilst being shown in the diagram as being co-located with the screen, could be remotely connected.

Each message has a "Tag number" to help users associate specific messages and actions. For example a user could send a message to another messages tag, (eg TAG23 I think you're your cute) such that the two messages can then become associated, displayed for example in the same color or with an graphical feature, such as an underline, that helps users see the two messages are related or connected. Similarly, a Tag can be used to help user-orientated moderation, for example (in a user interface in which the messages start large and then shrink over time) a user could send a command such as FADE23 to fade the message with the Tag 23, or GROW23 to grow the message with the Tag 23.

In accordance with an additional feature of the invention, there is provided a proximity sensor, typically mounted on or near each display, in order to measure the number of people passing within range of a location screen. The sensor can also be used to activate content or turn the location screen on or off when it detects activity.

In accordance with yet another feature of the invention, data and content such as but not limited to information, ring tones or games can be downloaded to a mobile communications device for (i) use for a limited time or (ii) use for a number of uses or (iii) use within range of the networked computing device. The same system can permit transfers of the downloaded data in a format that enables the portable computing device that downloaded it to transmit a copy of it to another device together with rules for the usage of that copy.

The invention thus provides for an interactive communications system and method, for typical use in public and retail spaces.

Figure 2:
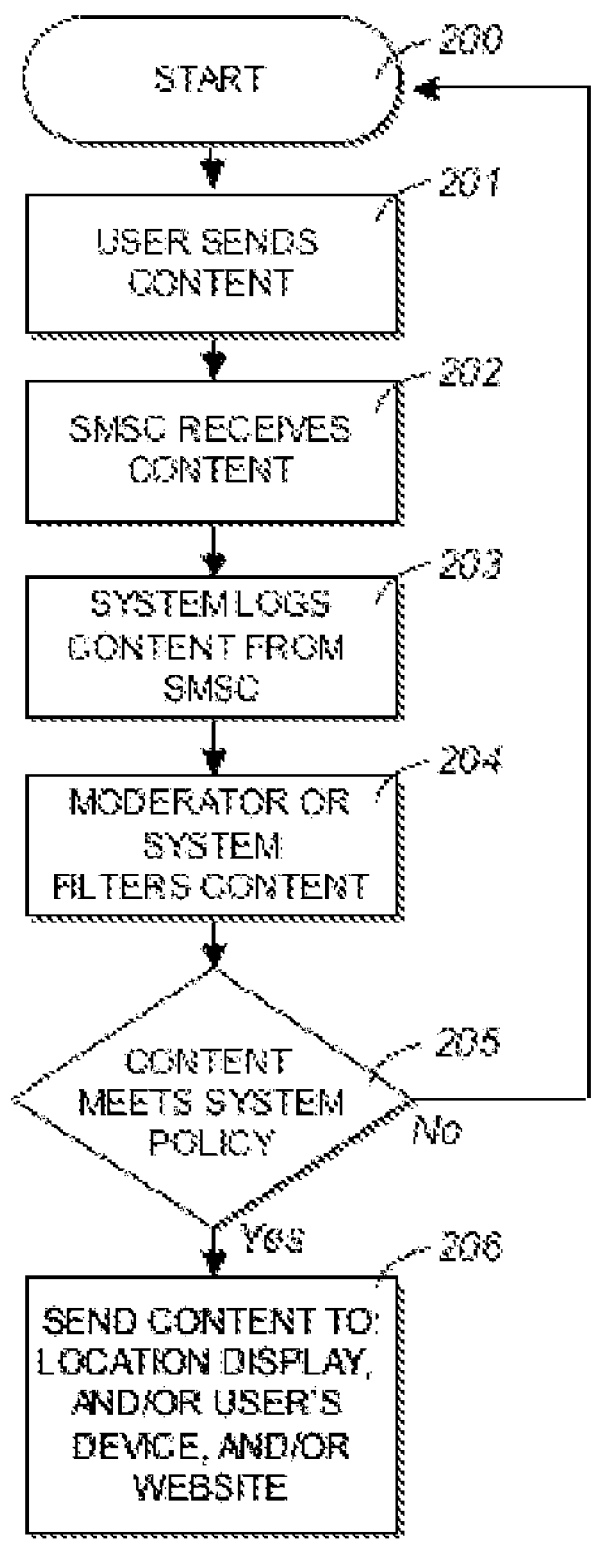
FIG. 2 is a flow diagram steps representative of the interaction between the system and a user in an exemplary embodiment of the present invention.

The general sequence of steps that are performed by the system in receiving and posting content will now be described with reference to FIG. 2. This process is intended to illustrate, and not limit, the scope of the invention.

A screen displays various messages encouraging consumers to interactive with it. For example a screen might display a message to text to a short code such as 5555. The user, responding to such a prompt, sends a text 201 to the displayed number. A communications system such as, but not limited to an SMSC system on a wireless network, 202, receives the message and passes it to the main system which logs the message 203. The system can also log the time of user's message and can include the capture of their telephone number if the user and/or network operator have not blocked or disabled such information. The system can set policies for displaying messages and/or content 204. For example, abusive words might be automatically filtered, or a moderator could manually decide whether or not to publish the content, 205. Some content might be suitable to publishing on the web, but not a publicly placed screen. If the content meets the system policies 205, the system can send the content to a location screen and/or a website 206. The system can also send a message to the user's mobile communication device.

Figure 3:
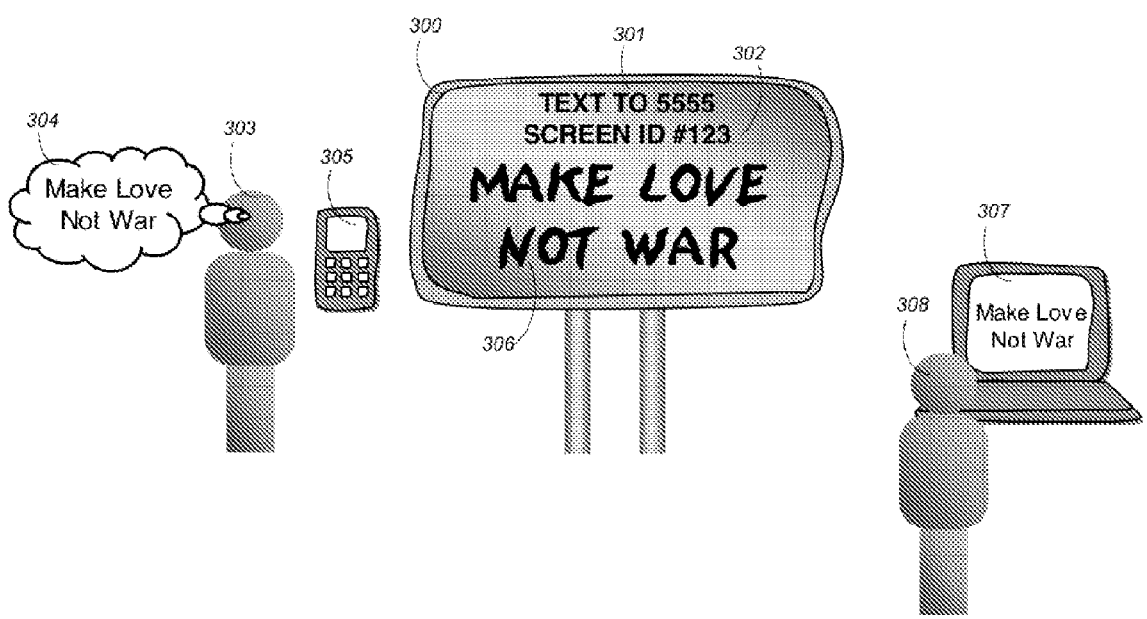
FIG. 3 is depicts a further exemplary embodiment of the present invention.

This process is shown figuratively in FIG. 3 from the user's perspective. A user 303, sees content on an Internet-connected screen 300, for example in the window of a store. The screen 300, displays a number to send messages to 301 and a screen location ID 302, which identifies the message as being intended for that specific screen. The user wishes to send a message, 304 by texting to the screen number and ID via their mobile communications device 305. The format of the message could be <ID> <Body text> <Destination> which in FIG. 3 would be "#123 Make love not war" sent to the short code 5555. An SMS short code is a short form of phone number, recognized by all participating network operators as an abbreviated number for a data call, such as a text message. A short code is easier to remember and quicker to dial than a standard 10 or 11 digit number.

One example of an application that would run on such as the above system is LocaModa's Wiffiti. Wiffiti is location-based wireless graffiti which anticipates the intersection of blogs, the ubiquity of mobile phones and the emergence of internet-connected screens in public spaces. The application runs on the LocaModa platform and is designed to capture the thoughts, or ideas of anyone with a mobile phone or an Internet connection. Wiffiti's purpose is to extend and empower public expression and creativity in locations, in a socially responsible way, fostering an open and strong sense of citizenship and community.

Figure 4:
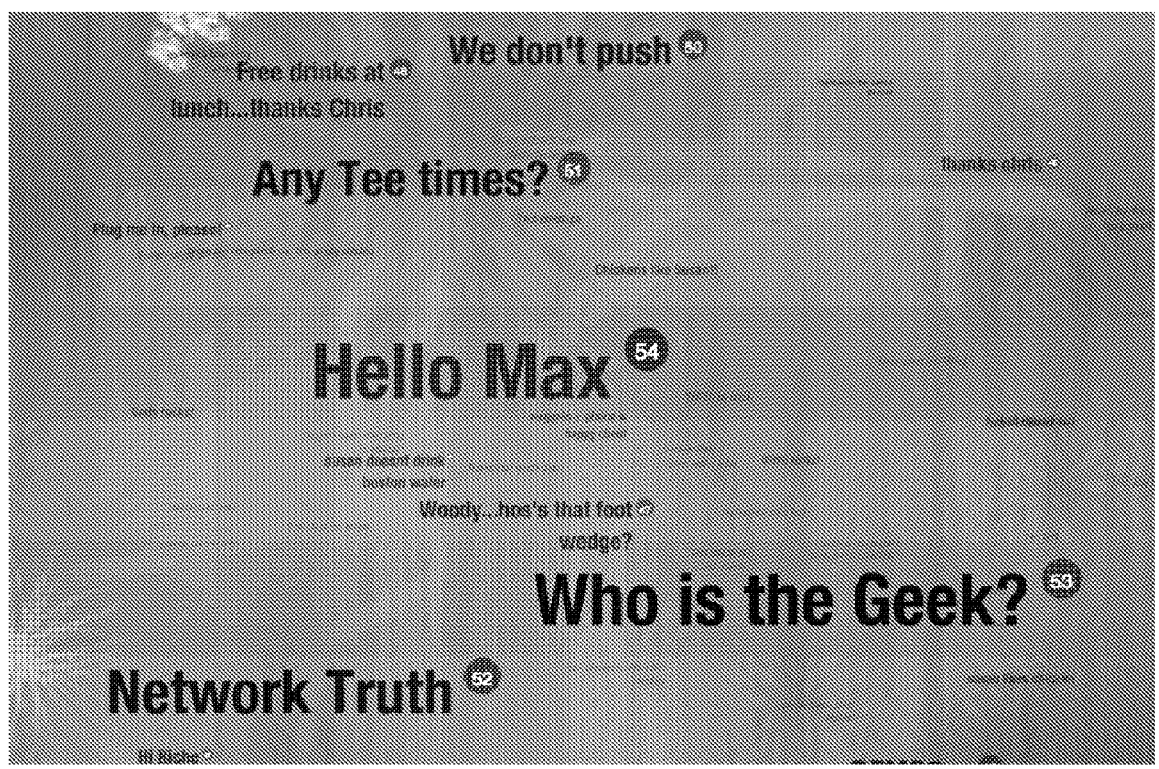
FIG. 4 depicts a display screen used according to an exemplary embodiment of the present invention.

As shown in FIG. 4, messages that are posted to a location screen of the present invention can also be displayed such that they are initially displayed larger (than older messages) and with a "new message" color, to differentiate them from the older messages. The new message fades and shrinks over time in order to helps users get a sense of time/age about the communication. For instance the message tagged as message 54 reading "Hello Max" may be displayed in blue, and at a large font size because it is the latest message received. The older messages 53, 52, 51 etc. are all displayed in black and are displayed in a smaller size corresponding to when they were posted, with the message number in this instance also reflecting when they were posted. The change in font size may occur as a function of time or as a function of new messages being added so that each time a new message is added, all other displayed messages shrink by a predetermined percentage.

As a further feature, a new message can display with a new color and fade to a color that is still differentiated from all other messages. When a New message is sent, the previous new message returns to the standard color. This not only helps users differentiate new messages, it also incentivizes users to send new messages (in order to be the only differentiated one).

Each message has a "Tag number" to help users associate specific messages and actions. For example a user could send a message to another messages tag, (eg TAG23 I think you're your cute) such that the two messages can then become associated, displayed for example in the same color or with an graphical feature, such as an underline, that helps users see the two messages are related or connected. Similarly, a Tag can be used to help user-orientated moderation, for example (in a user interface in which the messages start large and then shrink over time) a user could send a command such as FADE23 to fade the message with the Tag 23, or GROW23 to grow the message with the Tag 23.

These, and other display characteristics, may be implemented by the uses screen display parameters such as, but not limited to, an effective font size, a color, a location, a zoom, a stacking level, a transparency, a display angle, a location drift, a zoom drift, a stacking drift, a transparency drift and a display angle drift, where for every display attribute there is a corresponding drift parameter that is a function of time or of an event, such as a next posting or a number of postings. The drift parameter may be a simple function such as the change of the main parameter to another after a certain time or event, such as the change of the display color from blue to black after a next posting. The drift parameter may be a more complex function such as having the message fade and shrink over time by having time varying a transparency drift from opaque to completely transparent according to a linear, exponential or other suitable mathematical function, and a time varying zoom drift parameter that may change from full, initial size to zero according to a linear, exponential or other suitable mathematical function.

In a further embodiment of the system, the content management system may be connected directly to a display device to avoid having to communicate large content files over a network.

In yet a further embodiment of the system, there are navigational prompts on the display device that can be executed via the user's electronic communications device. The prompts may, for instance, be voice prompts over an IVR system and may compliment or match prompts graphically represented on the display device using data sent using standard protocols such as but not limited to Internet Protocal (IP) based formats, HTTP, XML, SMS and MMS.

In yet a further embodiment of the invention, the system further supports Internet Protocol services including at least one of streaming audio, streaming video and Internet telephony.

In yet a further embodiment of the invention, there is a qualification interface, capable of prompting a user to respond to queries that help the system direct the user's message according to rules set by a system controller.

In yet a further embodiment of the invention, there is an interface enabling the consumer to download data such as, but not limited to, a ring tone, a game, a graphics file, a music file, a video file or some combination thereof.

In yet a further embodiment of the invention the IVR system format is VoiceXML.

In yet a further embodiment of the invention, user specific data is captured from the user's electronic communications device such as but not limited to, a mobile phone number, area code, cell ID, GPS co-ordinates, the user's name, address or PIN and may include demographic information that may, for instance, be derived from the location of the display device, the user's area code, or the demographic information may be derived from the user's electronic communications device data such as but not limited to their area code.

In yet a further embodiment of the invention the display device may display an invitation to visit a website address for users to get more information.

In yet a further embodiment of the invention the website may invites users to enter their telephone number into the system and, having entered their telephone number into the system, the system, having previously captured the user's telephone number, can identify the user and/or the products that they were interested in;

In yet a further embodiment of the invention there may be an adaptive management system, capable of changing content displayed on at least one display device, according to the expected and resulting response rates of users in order to maximize the effectiveness of marketing the said content, and may include real-time capability to make such adjustments, and the adjustments may be made according to criteria such as frequency of responses, the timing of responses, the price of responses or the design of content;

In yet a further embodiment of the invention there may be a proximity sensor, mounted in such a manner on or near the display device, as to measure the number of people passing within range of each display device. In such an embodiment, the display device may be programmed to activate on receiving a signal from the proximity sensor.

In yet a further embodiment of the invention the display device may have content and data of a kind determined by that display device's physical location.

In yet a further embodiment of the invention there may be an module that outputs system logs to a Customer Relationship Management (CRM) system.

In yet a further embodiment of the invention the display device may updated according to information already known about the user;

In yet a further embodiment of the invention, the system may run multiple campaigns simultaneously using the same text or phone numbers or addresses and differentiates each via the unique electronic address or phone number associated with each display device, by, for instance, simultaneously using the same text or phone numbers or addresses and differentiating each via a unique content ID associated with every interactive content element.

In yet a further embodiment of the invention the system may further include a camera, mounted on or near the display device, in order to integrate live pictures or video of users into the content.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention

What is claimed is:

1. A system for providing and managing location-based interactive content, comprising:
    a plurality of display devices each located in a distinct geographic location, and wherein each display device comprises a unique display identifier,
    a content server, remote from said display devices and connected to said display devices by a first network, said content server operable to store content, said content comprising at least one data package representative of an audible sound, a graphic image or an alphanumeric character, and to serve said content to said display devices;
    at least one electronic communications device, connected to said content server via a second network, said electronic communications device operable to transmit and to receive messages to said server;
    a communications management module, operable on said content server, comprising:
    a user interface module operable to guide, respond to, and log a user initiated communication from an electronic communications device connected via said second network, said user interface module comprising means to capture and store voice messages and data messages entered by users, build profiles of users and record user interactions;
    a content management module operable to receive, filter and store said content, send commands for said content via said first network, send said content via said first network, to associate said content with unique identifiers and to create said content from said messages, said creating said content comprising the generation of content display parameters, said content display parameters comprising a time-stamp, a degree-of-importance stamp, a display location stamp, a user id stamp, a user location stamp and a presence stamp;
    a content direction and display module operable to direct said content and one or more screen display parameters to any of said display devices, and wherein said display module comprising means to translate said content display parameters into said screen display parameters, said screen display parameters comprising an effective font size, a color, a location, a zoom, a stacking level, a transparency, a location drift, a zoom drift, a stacking drift and a transparency drift; and
    a screen display module, operable on said display device for receiving said content and displaying said content on said display device responsive to said screen display parameters.

2. The system of claim 1 wherein said display device is one of a projector, a plasma screen, an light emitting diode (LED) screen and a cathode CRT, and further comprises an audio speakers.

3. The system of claim 1 wherein said second network is a wireless net work that is one of a cellular phone network, and IEEE 802.11 (WiFi) protocol network, a Bluetooth protocol network, an IEEE 802.15.4 (ZigBee) protocol network, and a Radio Frequency Identification (RFID) protocol wireless network.

4. The system of claim 1 wherein said communications management further comprises a module Interactive Voice Response (IVR) system or a a Short Message System Center (SMSC), or a combination thereof.

5. The system of claim 1 wherein said Interactive Voice Response (IVR) system is capable of handling more than one caller at a time and is capable of voice recognition.

6. The system of claim 1 further comprising a qualification interface configured to prompt a user to respond to queries that help the system direct the user's message according to a set of rules.

7. The system of claim 1 further comprising an interface configured to enable the download of data, and wherein said data is a ring tone, a game, a graphics file, a music file or a video file, or some combination thereof.

8. The system of claim 1 further comprising means for capturing user specific data, and wherein said user specific data is a mobile phone number, an area code, a cell ID, a GPS co-ordinate, a user's name, an address or a PIN, or some combination thereof.

9. The system of claim 1 further comprising a proximity sensor mounted on or near said display device, said proximity sensor configured to measure a number of people passing within a predetermined range of said display device, and wherein said display device is further configured to activate on receiving a signal from said proximity sensor.

10. The system of claim 1 further comprising a camera mounted on or near said display device, and wherein said display device is further configured to display live images from said camera.

11. A method for providing and managing location-based interactive content, comprising:
    locating a plurality of display devices such that each display device is in a distinct geographic location, and wherein each display device comprises a unique display identifier,
    storing content on a content server, said content server located remote from said display devices and connected to said display devices by a first network, said content comprising at least one data package representative of an audible sound, a graphic image or an alphanumeric character;
    transmitting and receiving messages from at least one electronic communications device to said server via a second network;
    operating a user interface module of a communications management module on said content server so as to guide, respond to, and log a user initiated communication from an electronic communications device connected via said second network, said user interface module comprising means to capture and store voice messages and data messages entered by users, build profiles of users and record user interactions;

operating a content management module of said communications management module on said content server so as to receive, filter and store said content, send commands for said content via said first network, send said content via said first network, associate said content with unique identifiers and create said content from said messages, wherein said creating said content comprises generating content display parameters, said content display parameters compising a time-stamp, a degree-of-importance stamp, a display location stamp, a user id stamp, a user location stamp and a presence stamp;

operating a content direction and display module of said communications management module on said content server so as to direct said content and one or more screen display parameters to one of said display devices, and wherein said display module translates said content display parameters into said screen display parameters, said screen display parameters comprising an effective font size, a color, a location, a zoom, a stacking level, a transparency, a location drift, a zoom drift, a stacking drift and a transparency drift; and receiving and displaying said content on said display device responsive to said screen display parameters by a screen display module running on said display device.

12. The method of claim 11 wherein said display device is one of a projector, a plasma screen, an light emitting diode (LED) screen and a cathode CRT, and further comprises an audio speakers.

13. The method of claim 11 wherein said second network is a wireless net work that is one of a cellular phone network, and IEEE 802.11 (WiFi) protocol network, a Bluetooth protocol network, an IEEE 802.15.4 (ZigBee) protocol network, and a Radio Frequency Identification (RFID) protocol wireless network.

14. The method of claim 11 wherein said communications management further comprises a module Interactive Voice Response (IVR) system or a a Short Message System Center (SMSC), or a combination thereof.

15. The method of claim 11 wherein said Interactive Voice Response (IVR) system is capable of handling more than one caller at a time and is capable of voice recognition.

16. The method of claim 11 further comprising prompting a user to respond to queries that help the system direct the user's message according to a set of rules, using a qualification interface.

17. The method of claim 11 further comprising downloading one or more data, and wherein said data is a ring tone, a game, a graphics file, a music file or a video file, or some combination thereof.

18. The method of claim 11 further comprising capturing user specific data, and wherein said user specific data is a mobile phone number, an area code, a cell ID, a GPS coordinate, a user's name, an address or a PIN, or some combination thereof.

19. The method of claim 11 further comprising measuring a number of people passing within a predetermined range of said display device using a proximity sensor mounted on or near said display device, and activating said display device on receiving a signal from said proximity sensor.

20. The method of claim 11 further comprising displaying live images from a camera mounted on or near said display device.

* * * * *

UNITED STATES PATENT AND TRADEMARK OFFICE
CERTIFICATE OF CORRECTION

PATENT NO. : 7,450,954 B2
APPLICATION NO. : 11/275939
DATED : November 11, 2008
INVENTOR(S) : Stephen Randall It is certified that error appears in the above-identified patent and that said Letters Patent is hereby corrected as shown below:

On title page, item 73 Assignee,
replace "LaModa, Inc."
with "LocaModa, Inc."

In Col. 12, line 11
replace "comprises an audio"
with "comprises audio"

In Col. 12, line 14
replace "wireless net work that is one of a cellular phone network, and"
with "wireless network that is one of a cellular phone network, an"

In Col. 12, line 21
replace "system or a a Short"
with "system or a Short"

In Col. 13, line 13
replace "compising"
with "comprising"

In Col. 13, lines 31 and 32
replace "comprises an audio"
with "comprises audio"

UNITED STATES PATENT AND TRADEMARK OFFICE
CERTIFICATE OF CORRECTION

PATENT NO. : 7,450,954 B2
APPLICATION NO. : 11/275939
DATED : November 11, 2008
INVENTOR(S) : Stephen Randall It is certified that error appears in the above-identified patent and that said Letters Patent is hereby corrected as shown below:

In Col. 13, line 34
replace "wireless net work"
with "wireless network"

In Col. 14, line 1
replace "and IEEE"
with "an IEEE"

In Col. 14, line 7
replace "system or a a Short"
with "system or a Short"

Signed and Sealed this

Twenty-fourth Day of March, 2009

JOHN DOLL
*Acting Director of the United States Patent and Trademark Office*